Nov. 17, 1964 G. C. MAY ET AL 3,157,373
VERTICAL LIFT GAS TURBINE ENGINE
Filed Jan. 15, 1963 3 Sheets-Sheet 1
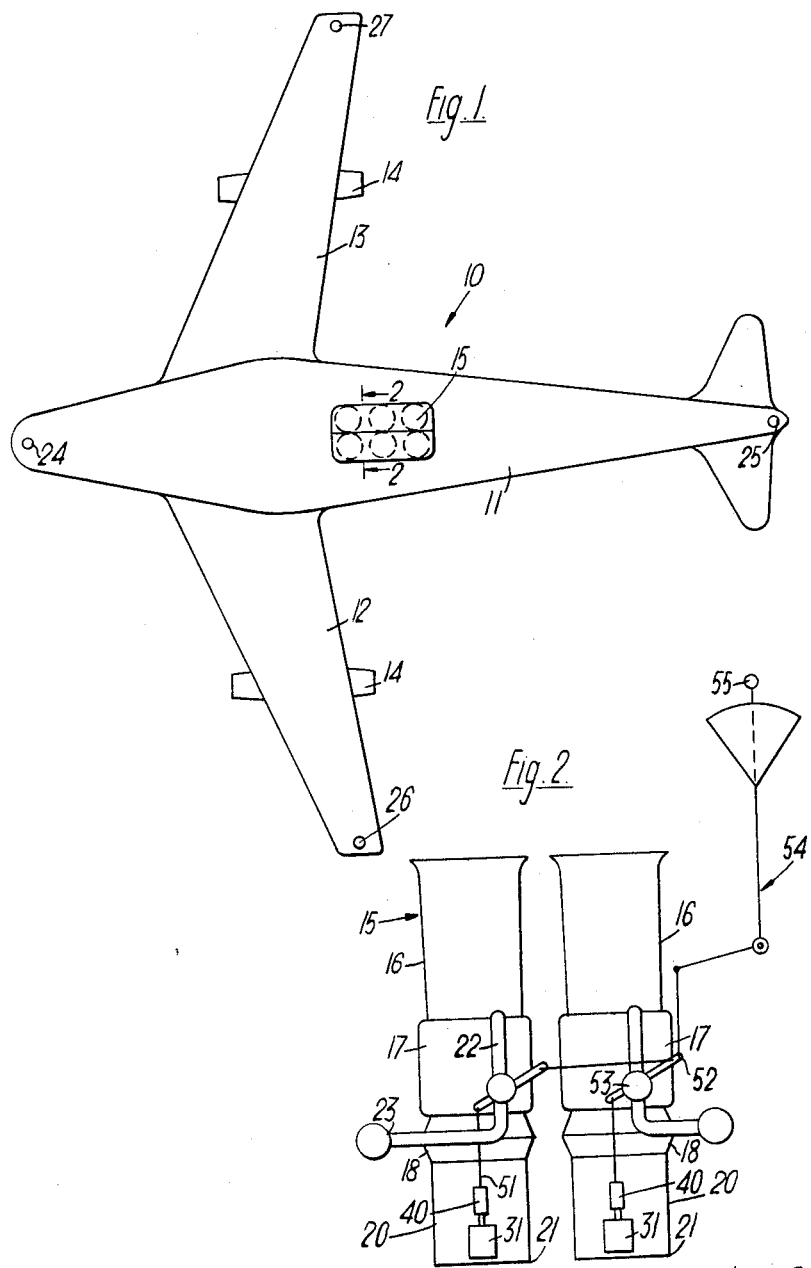

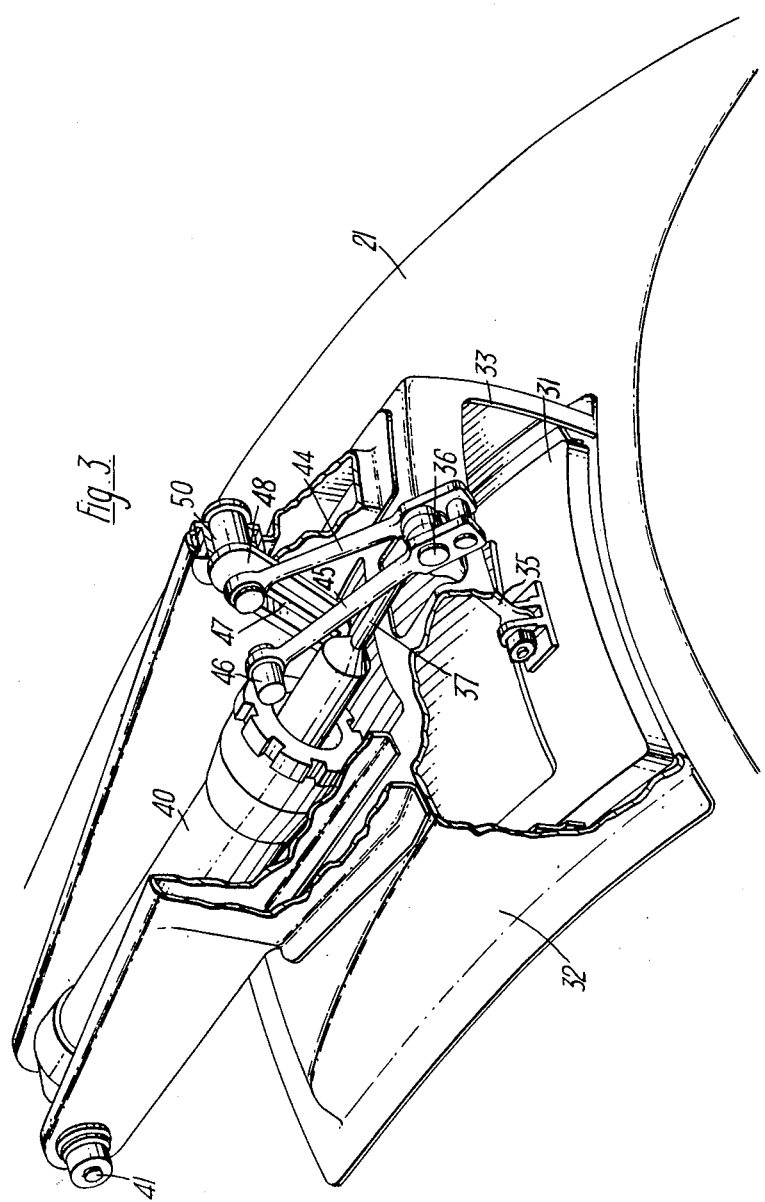

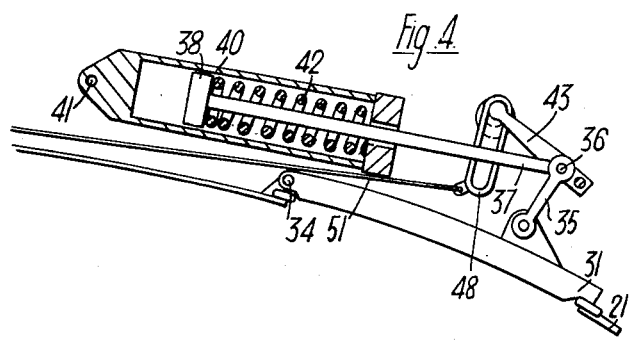
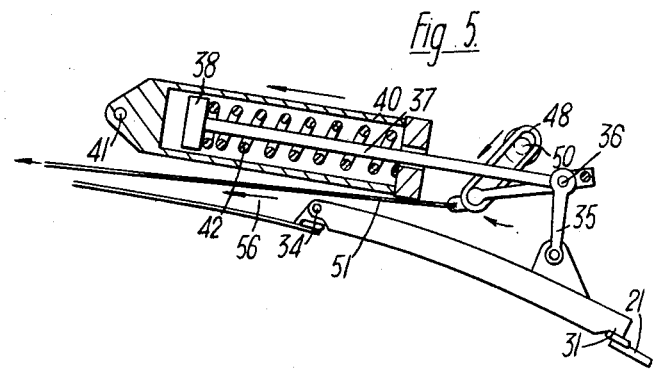
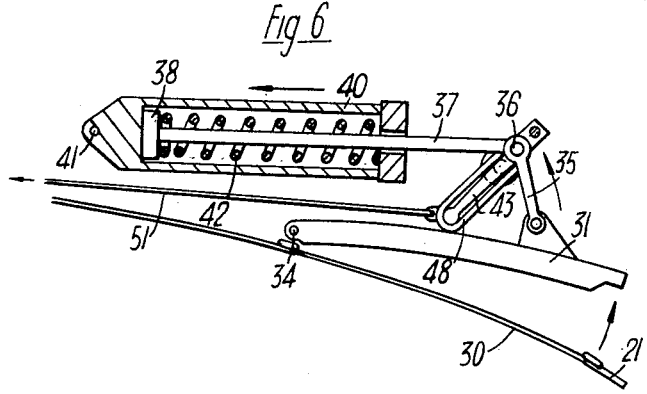

United States Patent Office 3,157,373
Patented Nov. 17, 1964

3,157,373
VERTICAL LIFT GAS TURBINE ENGINE
Gordon Cyril May, Allestree Park, Derby, and Alexander Stewart, Spondon, Derby, England, assignors to Rolls-Royce Limited, Derby, England, a company of Great Britain
Filed Jan. 15, 1963, Ser. No. 251,544
10 Claims. (Cl. 244—23)

This invention concerns vertical lift gas turbine engines.

The term "vertical lift engine" as used in this specification is to be understood to refer to an engine which is adapted to produce vertical lift forces on an aircraft independently of those generated aerodynamically by forward flight.

According to the present invention, there is provided a vertical lift gas turbine engine comprising in flow series a compressor, combustion equipment, a turbine and a final nozzle, a bleed conduit arranged upstream of the combustion equipment and extending externally of the engine, means for supplying said bleed conduit with a proportion of the air compressed by the compressor, and means for varying the effective area of said final nozzle so as to vary the speed of the turbine and compressor and hence the amount of air supplied to the bleed conduit.

Preferably there is provided a latch for maintaining the final nozzle in a minimum area position, means for unlatching the latch, and means urging said final nozzle towards a maximum area position.

The area of the final nozzle is preferably variable by flap means and the turbine exhaust gases may act on the flap means so as to urge the latter towards the maximum area position.

Preferably the flap means comprises a flap which is arranged to open and close an aperture in the wall of the final nozzle.

The flap may be pivotally mounted, there being means for resiliently urging the flap about its pivot in an opening direction.

The flap may be provided with an abutment member which engages a movable abutment, means being provided for moving the movable abutment between positions in which it respectively prevents and permits opening of the flap.

Thus the abutment member may comprise a link having a head which is slidable in a pivotally mounted track, said track constituting the movable abutment, pivotal movement of the track permitting sliding movement of the head therein between positions in which opening of the flap is respectively prevented and permitted.

The invention also comprises an aircraft adapted for vertical take-off and landing and provided with a plurality of vertical lift engines as set forth above, the bleed conduits of the vertical lift engines being arranged to supply air to nozzle means on said aircraft for effecting attitude control.

The term "attitude control," as used in this specification is to be understood to mean control of pitching, rolling, yawing and the like.

If desired, there may be provided means, responsive to the failure of one or more of the vertical lift engines, for moving the final nozzle of each remaining vertical lift engine into the maximum area position.

The invention is illustrated, merely by way of example in the accompanying drawings in which:

FIGURE 1 is a plan view of an aircraft provided with vertical lift engines according to the present invention, FIGURE 2 is a diagrammatic view taken on the line 2—2 of FIGURE 1 and showing two of the said vertical lift engines, FIGURE 3 is a broken away perspective view of part of the final nozzle of one of the said vertical lift engines, and, FIGURES 4-6 are diagrammatic sectional views showing the structure illustrated in FIGURE 3 in various different positions.

Referring to the drawings, an aircraft 10, which is adapted for vertical take-off and landing, has a fuselage 11 and wings 12, 13. The wings 12, 13 are provided with forward propulsion gas turbine engines 14 and the fuselage 11 is provided with a bank of say, six vertical lift gas turbine engines 15.

Each of the vertical lift engines 15, as shown in FIGURE 2, comprises in flow series a compressor 16, combustion equipment 17, and a turbine 18, the turbine exhaust gases being discharged to atmosphere through a jet pipe 20 whose downstream end is provided with a final nozzle 21.

Each vertical lift engine 15 is provided with a bleed conduit 22 which communicates with the compressor 16 immediately upstream of the combustion equipment 17 and which is arranged to receive a proportion of the air compressed by the compressor 16.

The bleed conduits 22 extend externally of their vertical lift engines 15 and are adapted to supply air to manifolds 23. The manifolds 23 supply the air to nozzles 24, 25, which are respectively arranged at the forward and after end of the fuselage 11, and nozzles 26, 27 which are arranged adjacent the tips of the wings 12, 13 respectively.

Means (not shown) are provided for adjusting the relative quantities of air supplied to the nozzle 24 and to the nozzle 25 respectively whereby to control the disposition of the aircraft with respect to an axis extending transversely of the fuselage 11. Means (not shown) are also provided for adjusting the relative quantities of air supplied to the nozzles 26 and to the nozzle 27 respectively whereby to control the disposition of the aircraft with respect to an axis extending longitudinally of the fuselage 11. Thus the flight attitude of the aircraft 10 may be controlled by varying the quantities of air supplied to the nozzles 24–27.

The wall of the final nozzle 21 of each vertical lift engine 15 is provided with an aperture 30 (see FIGURE 6) which is adapted to be opened and closed by a flap 31.

Each flap 31 is disposed within a housing 32 mounted externally of its respective final nozzle 21, the housing 32 having a downstream facing opening 33. Each flap 31 is mounted on a pivot 34, the pivot 34 being disposed upstream of its respective aperture 30.

Each flap 31 is pivotally connected to a link 35. The end of the link 35 remote from its flap 31 is mounted on a pivot 36. The pivot 36 is carried by a piston rod 37 of a piston 38.

Each of the pistons 38 is slidably mounted in a cylinder 40 which is mounted on a pivot 41. A spring 42, which is disposed within each cylinder 40 acts on the respective piston 38 so as to urge it towards the left, as seen in FIGURES 4–6.

An operating link 43, which is mounted on each pivot 36, has parallel arms 44, 45 each of which carries a head or stud 46. Each stud 46 is slidable in a slot 47 of a track member 48, the track member 48 being mounted on a pivot 50.

Each track member 48 is connected, at its end remote from its pivot 50, to a cable 51 which is connected to a valve operating lever 52 (FIGURE 2). Each valve operating lever 52 controls a valve 53 which itself controls the amount of air flowing through the respective bleed conduit 22. All the valve operating levers 52 are connected by a common linkage 54 to a manually operable lever 55.

So long as the track members 48 remain in the position shown in FIGURE 4, in which the studs 46 are disposed adjacent the pivots 50, the flaps 31 cannot be opened. Thus the arrangement of elements 35–38, 40–48 and 50 inclusive effectively constitutes a latch for maintaining the respective final nozzles 25 in their effective minimum area positions. If, however, the lever 55 is actuated so as to pull the cables 51 in the direction of the arrow 56 (FIGURE 5) the track members 48 are moved clockwise about their pivots 50, as shown in FIGURE 5. This permits the studs 46 to travel to the ends of the track members 48 remote from the pivots 50, such travel being brought about by the action of the springs 42, and in operation, by the action of the turbine exhaust gases on the flaps 31. The flaps 31 will therefore then assume the position shown in FIGURE 6.

During a vertical ascent or descent, the lever 55 is normally disposed in a position in which the flaps 31 are closed. In this position the valves 53 are so set that, say, 3% to 5% of the air compressed by the compressors 16 of the vertical lift engines 15 is supplied to the bleed conduits 22 for attitude control purposes.

If however, one or more of the vehicle lift engines 15 should fail during the vertical ascent or descent, then the thrust developed by the remaining vertical lift engines 15 will exert a substantial turning moment on the aircraft 10 about an axis whose position depends on which of the engines 15 has failed.

In order to counteract this turning moment it is necessary to supply the nozzles 24–27 with an increased supply of air. This may be effected by manually moving the lever 55 to a position in which the cables 51 exert a pull such as to effect opening of the flaps 31, as shown in FIGURE 6. When this occurs, the effective area of the final nozzles 21 will be increased and the back pressures on the turbines 18 will be reduced. The turbines 18 and their compressors 16 will therefore overspeed, whereby the amounts of air supplied to the bleed conduits 22 will rise so as to constitute, say, 12% of the output of the compressors 16.

Once the flaps 31 have been opened it is not possible, in the construction shown, to close them again whilst the aircraft is in flight, since resetting of the parts from the FIGURE 6 to the FIGURE 4 position has to be effected manually. This inability to close the flaps 31 whilst the aircraft is in flight is of little importance, however, since, once a vertical lift engine 15 has failed completely, it is unlikely to prove possible to bring it back into operation during the flight and there will therefore be no need to restore the final nozzles 21 to their minimum area positions by closing the flaps 31.

We claim:

1. A vertical lift gas turbine engine comprising in flow series a compressor, combustion equipment, a turbine and a final nozzle; a bleed conduit arranged upstream of the combustion equipment and extending externally of the engine; means for supplying said bleed conduit with a proportion of the air compressed by the compressor; and means for varying the effective area of said final nozzle so as to vary the speed of the turbine and compressor and hence the amount of air supplied to the bleed conduit.

2. A vertical lift gas turbine engine comprising in flow series a compressor, combustion equipment, a turbine and a final nozzle; a bleed conduit arranged upstream of the combustion equipment and extending externally of the engine; means for supplying said bleed conduit with a proportion of the air compressed by the compressor; means for varying the effective area of said final nozzle so as to vary the speed of the turbine and compressor and hence the amount of air supplied to the bleed conduit; a latch for maintaining the final nozzle in a minimum area position; means for unlatching the latch; and means urging said final nozzle towards a maximum area position.

3. A vertical lift gas turbine engine comprising in flow series a compressor, combustion equipment, a turbine and a final nozzle, a bleed conduit arranged upstream of the combustion equipment and extending externally of the engine; means for supplying said bleed conduit with a proportion of the air compressed by the compressor; flap means for varying the effective area of said final nozzle so as to vary the speed of the turbine and compressor and hence the amount of air supplied to the bleed conduit; a latch for maintaining the flap means in a position in which the final nozzle has a minimum effective area; means for unlatching the latch and means urging said flap means towards a position in which the final nozzle has a maximum effective area.

4. A vertical lift gas turbine engine comprising in flow series a compressor, combustion equipment, a turbine and a final nozzle; a bleed conduit arranged upstream of the combustion equipment and extending externally of the engine; means for supplying said bleed conduit with a proportion of the air compressed by the compressor; flap means for varying the effective area of said final nozzle so as to vary the speed of the turbine and compressor and hence the amount of air supplied to the bleed conduit; a latch for maintaining the flap means in a position in which the final nozzle has a minimum effective area; means for unlatching the latch; and means permitting the turbine exhaust gases to act on the flap means so as to urge the latter towards a position in which the final nozzle has a maximum effective area.

5. A vertical lift gas turbine engine comprising in flow series a compressor, combustion equipment, a turbine, and a final nozzle having an aperture in its wall; a bleed conduit arranged upstream of the combustion equipment and extending externally of the engine; means for supplying said bleed conduit with a proportion of the air compressed by the compressor; a flap which is arranged to open and close the aperture in the wall of the final nozzle; a latch for maintaining the flap closed; means for unlatching the latch; and means permitting the turbine exhaust gases to act on the flap so as to urge the latter open.

6. A vertical lift gas turbine engine comprising in flow series a compressor, combustion equipment, a turbine, and a final nozzle having an aperture in its wall; a bleed conduit arranged upstream of the combustion equipment and extending externally of the engine; means for supplying said bleed conduit with a proportion of the air compressed by the compressor; a flap which is pivotally mounted on the wall of the final nozzle and arranged to open and close the aperture therein; means for resiliently urging the flap about its pivot axis in an opening direction; a latch for maintaining the flap closed; means for unlatching the latch; and means permitting the turbine exhaust gases to act on the flap so as to urge the latter open.

7. A vertical lift gas turbine engine comprising in flow series a compressor, combustion equipment, a turbine, and a final nozzle having an aperture in its wall; a bleed conduit arranged upstream of the combustion equipment and extending externally of the engine, means for supplying said bleed conduit with a proportion of the air compressed by the compressor; a flap pivotally mounted on the wall of a final nozzle and arranged to open and close the aperture therein; means for resiliently urging the flap about its pivot in an opening direction; an abutment member on said flap, a movable abutment which engages said abutment member; means for moving the movable abutment between positions in which it so cooperates with the abutment member on the flap that it respectively prevents and permits opening of the flap; and means permitting the turbine exhaust gases to act on the flap to urge the latter open.

8. In an aircraft adapted for vertical take-off and landing, a plurality of vertical lift engines each of which comprises in flow series a compressor, combustion equipment, a turbine and a final nozzle; a bleed conduit arranged upstream of the respective combustion equipment and extending externally of the respective engine; means for supplying said bleed conduit with a proportion of the air compressed by the respective compressor; and means for varying the effective area of the respective final nozzle so as to vary the speed of the respective turbine and compressor and hence the amount of air supplied to the respective bleed conduit; and a nozzle means on said aircraft for effecting attitude control; the bleed conduit of the vertical lift engines supplying air to said nozzle means.

9. A vertical lift engine comprising in flow series a compressor, combustion equipment, a turbine, and a final nozzle having an aperture in its wall; a bleed conduit arranged upstream of the combustion equipment and extending externally of the engine; means for supplying said bleed conduit with a proportion of the air compressed by the compressor; a flap pivotally mounted on the wall of a final nozzle and arranged to open and close the aperture therein; means for resiliently urging the flap about its pivot in an opening direction; an abutment member on said flap comprising a link having a head which is slidable in a pivotally mounted track, said track constituting a movable abutment, pivotal movement of the track permitting sliding movement of the head therein between positions in which opening of the flap s respectively prevented and permitted; and means permitting the turbine exhaust gases to act on the flap to urge the latter open.

10. A vertical lift gas turbine engine comprising in flow series a compressor, combustion equipment, a turbine, and a final nozzle having an aperture in its wall; a bleed conduit arranged upstream of the combustion equipment and extending externally of the engine, said bleed conduit being supplied with a proportion of the air compressed by the compressor; valve means in said bleed conduit for varying the bleed flow therethrough, a flap arranged to open and close the aperture in the wall of the final nozzle; a latch for maintaining the flap closed; means for unlatching the latch; means causing the turbine exhaust gases to act on the flap so as to urge the latter open; and a mechanical linkage between said valve means and said means for unlatching the latch so that the bleed flow is increased when the latch is unlatched.

References Cited by the Examiner
UNITED STATES PATENTS

| | | | |
|---|---|---|---|
| 2,481,330 | 9/45 | Neal | 60—35.5 |
| 2,551,229 | 5/51 | Alford et al. | 60—35.6 K |
| 2,564,671 | 8/51 | Brown | 60—35.6 K |
| 2,945,641 | 7/60 | Pribram | 244—12 |
| 3,055,174 | 9/62 | Grotz et al. | 60—35.6 K |
| 3,060,681 | 10/62 | Morley et al. | 60—35.6 K |

FOREIGN PATENTS

| | | |
|---|---|---|
| 610,143 | 10/48 | Great Britain. |
| 806,030 | 12/58 | Great Britain. |

FERGUS S. MIDDLETON, *Primary Examiner.*